United States Patent [19]
Abe et al.

[11] Patent Number: 5,473,705
[45] Date of Patent: Dec. 5, 1995

[54] SIGN LANGUAGE TRANSLATION SYSTEM AND METHOD THAT INCLUDES ANALYSIS OF DEPENDENCE RELATIONSHIPS BETWEEN SUCCESSIVE WORDS

[75] Inventors: Masahiro Abe; Hiroshi Sakou, both of Dublin, Ireland; Hirohiko Sagawa, Kokubunji, Japan; Indurkhya Nitin, Vic, Australia

[73] Assignee: Hitachi, Ltd., Tokyo, Japan

[21] Appl. No.: 29,046

[22] Filed: Mar. 9, 1993

[30] Foreign Application Priority Data

Mar. 10, 1992 [JP] Japan .................................. 4-051300

[51] Int. Cl.$^6$ .................................................. G06K 9/00
[52] U.S. Cl. .......................... 382/100; 382/229; 434/116; 395/2.8
[58] Field of Search .............................. 382/1, 100, 103, 382/107, 229; 348/77; 364/419.03, 419.04; 395/2.8, 2.86; 434/112, 116

[56] References Cited

U.S. PATENT DOCUMENTS

| | | | |
|---|---|---|---|
| 4,414,537 | 11/1983 | Grimes | 340/365 R |
| 5,047,952 | 9/1991 | Kramer et al. | 364/513.5 |

FOREIGN PATENT DOCUMENTS

| | | | |
|---|---|---|---|
| 0600605 | 6/1994 | European Pat. Off. | 434/116 |
| 2-144675 | 6/1990 | Japan | G06F 15/62 |
| 6-67601 | 3/1994 | Japan | 434/112 |
| 6-138815 | 5/1994 | Japan | 434/112 |

OTHER PUBLICATIONS

"Proceedings of Conference on Human Factors in Computing System" CHI'91, (1991), pp. 237–242.
"Continuous Word Recognition Using Continuous DP", Voice Study Group of Acoustical Society of Japan, S78–20, 1978, pp. 145–152.
"Neural Computer–Learning from Brains and Neurons", Aihara, Publication Dept. of Tokyo Electric College, 1988, pp. 93–128.

*Primary Examiner*—Leo H. Boudreau
*Assistant Examiner*—Andrew W. Johns
*Attorney, Agent, or Firm*—Antonelli, Terry, Stout & Kraus

[57] ABSTRACT

A sign language translation system and method that not only recognizes words of a sign language but also supplements omitted words between the words of the sign language, to thereby generate a spoken language. The sign language translation system has an input unit for inputting at least the motion of hands, a language generating unit responsive to the inputted motion of hands for recognizing the words corresponding to the motion of hands and generating a spoken language using the relationship between the recognized words, and an output unit for outputting the generated spoken language. The sign language translation system and method can translate a sign language into an easy-to-understand spoken language.

19 Claims, 12 Drawing Sheets

| DATA | | TIME | T0 | T1 | ... | Tn |
|---|---|---|---|---|---|---|
| RIGHT HAND | THUMB | 1ST ARTICULATION | | | | |
| | | 2ND ARTICULATION | | | | |
| | INDEX FINGER | 1ST ARTICULATION | | | | |
| | | 2ND ARTICULATION | | | | |
| | ... | ... | | | | |
| | LITTLE FINGER | 1ST ARTICULATION | | | | |
| | | 2ND ARTICULATION | | | | |
| | POSITION | X | | | | |
| | | Y | | | | |
| | | Z | | | | |
| | DIRECTION | α | | | | |
| | | β | | | | |
| | | γ | | | | |
| LEFT HAND | THUMB | 1ST ARTICULATION | | | | |
| | | 2ND ARTICULATION | | | | |
| | INDEX FINGER | 1ST ARTICULATION | | | | |
| | | 2ND ARTICULATION | | | | |
| | ... | ... | | | | |
| | LITTLE FINGER | 1ST ARTICULATION | | | | |
| | | 2ND ARTICULATION | | | | |
| | POSITION | X | | | | |
| | | Y | | | | |
| | | Z | | | | |
| | DIRECTION | α | | | | |
| | | β | | | | |
| | | γ | | | | |

FIG. 8

| WORD (81) | PART OF SPEECH (82) | MEANING (83) | DEPENDED WORD (84) | DEPENDABLE CASE (85) | SUPPLEMENT RESULT (86) |
|---|---|---|---|---|---|
| "私" (WATAKUSHI=I) | PRONOUN | ⟨PERSON⟩ | "行く" (IKU) | SUBJECTIVE CASE | "私は" (WATAKUSHIWA = I AM) |
| "冬" (FUYU= WINTER) | NOUN | ⟨TIME⟩ | "行く" (IKU) | TIME CASE | "冬に" (FUYU NI = IN THE WINTER) |
| "北海道" (HOKKAIDO) | PROPER NOUN | ⟨PLACE⟩ | "行く" (IKU) | PLACE CASE | "北海道へ" (HOKKAIDO E = TO HOKKAIDO) |
| "行く" (IKU = GO) | FOUR-STEP CONJUGATIVE VERB | ⟨OPERATION⟩ | "思う" (OMOU) | OBJECT CASE | "行こうと" (IKOU TO = OF GOING) |
| "思う" (OMOU= THINK) | FOUR-STEP CONJUGATIVE VERB | ⟨OPERATION⟩ | — | — | "思う" (OMOU = THINKING) |

| WORD | PART OF SPEECH | MEANING |
|---|---|---|
| " 冬 " (FUYU=WINTER) | PRONOUN | ⟨PERSON⟩ |
| " 北海道 " (HOKKAIDO) | NOUN | ⟨TIME⟩ |
| " 私 " (WATAKUSHI=I) | PROPER NOUN | ⟨PLACE⟩ |
| . . . | . . . | . . . |

| |
|---|
| " 行く " (IKU=GO) — 1004 |
| " 北海道 " (HOKKAIDO) — 1003 |
| " 冬 " (FUYU=WINTER) — 1002 |
| " 私 " (WATAKUSHI=I) — 1001 |

FIG. 11

| VERB | DEPENDABLE CASE | MEANING | CASE POST-POSITION |
|---|---|---|---|
| "思う" (OMOU=THINK) | SUBJECTIVE CASE | ⟨PERSON⟩ | "は" (WA) |
|  | OBJECT CASE | ⟨OBJECT⟩ | "と" (TO) |
| "行く" (IKU=GO) | SUBJECTIVE CASE | ⟨PERSON⟩ | "は" (WA) |
|  | TIME CASE | ⟨TIME⟩ | "に" (NI) |
|  | PLACE CASE | ⟨PLACE⟩ | "へ" (E) |
| . . . | . . . | . . . | . . . |

FIG. 12

| RULE ~121 | |
|---|---|
| CONDITION ~122 | PART OF SPEECH OF DEPENDING WORD = NOUN, PRONOUNS, OR PROPER NOUN ~1221<br>PART OF SPEECH OF DEPENDED WORD = VERB ~1222<br>DEPENDENCE = SUBJECTIVE, TIME, PLACE, OR OBJECTIVE CASE ~1223 |
| SUPPLE-MENT METHOD ~123 | WORD + CASE POSTPOSITION INDICATED BY DEPENDENCE |

| RULE ~124 | |
|---|---|
| CONDITION ~125 | PART OF SPEECH OF DEPENDING WORD = VERB ~1251<br>MEANING OF DEPENDING WORD = OPERATION ~1252<br>CASE POSTPOSITION OF DEPENDING WORD = "と" (TO = OF) ~1253<br>DEPENDED WORD = "思う" (OMOU = THINK) ~1254 |
| SUPPLE-MENT METHOD ~126 | WORD (NEGATIVE FROM 2 OF VERB) + INTENTION AUXILIARY VERB "う" (U = INTENTION) (ENDING FORM) + "と" (TO = OF) |

FIG. 13

| PART OF SPEECH | CLASSIFICATION | TYPE | NEGATIVE | CONTINUATIVE | CONCLUSIVE | ATTRIBUTIVE | CONDITIONAL | IMPERATIVE |
|---|---|---|---|---|---|---|---|---|
| VERB | "カ"(KA) COLUMN FOUR-STEP 131 | 1 | "か"(KA) | "き"(KI) | "く"(KU) | "く"(KU) | "け"(KE) | "け"(KE) |
| VERB | | 2 | "こ"(KO) | "い"(I) | | | | |
| VERB | "サ"(SA) COLUMN FOUR-STEP | 1 | "さ"(SA) | "し"(SI) | "す"(SU) | "す"(SU) | "せ"(SE) | "せ"(SE) |
| VERB | | 2 | "そ"(SO) | | | | | |
| VERB | ... | | | | | | | |
| AUXILIARY VERB | INTENTION "う" (U=INTENTION) | 1 | | | "う"(U) 132 | "う"(U) | | |
| AUXILIARY VERB | PASSIVE "れる" (RERU=PASSIVE) | 1 | "れ"(RE) | "れ"(RE) | "れる"(RERU) | "れる"(RERU) | "れれ"(RERE) | "れろ"(RERO) "れよ"(REYO) |
| AUXILIARY VERB | | 2 | | | | | | |
| AUXILIARY VERB | ... | | | | | | | |

FIG. 14

| I AM THINKING OF GOING TO HOKKAIDO IN THE WINTER |
|---|

SIGN LANGUAGE TRANSLATION SYSTEM AND METHOD THAT INCLUDES ANALYSIS OF DEPENDENCE RELATIONSHIPS BETWEEN SUCCESSIVE WORDS

BACKGROUND OF THE INVENTION

1. Field of the Invention

The present invention relates to a sign language translation system and method for recognizing a type of sign language and translating it into a spoken language.

2. Description of the Related Art

As described in Proceedings of Conference on Human Factors in Computing Systems CHI'91 (1991), pp. 237 to 242, a conventional sign language translation method recognizes a sign language by converting the motion of hands wearing gloves with special sensors into electrical signals and checking whether the pattern of signals matches any one of previously registered signal patterns.

Another conventional method described in JP-A-2-144675 recognizes finger spellings by taking an image of a pair of colored gloves by a TV camera to derive color information of differently colored areas of the gloves and by determining whether the pattern of the derived color information matches any one of previously registered color information patterns.

There are three types of Japanese sign languages, including (1) "a traditional type sign language" having been used by auditory-impaired persons, (2) "a simultaneous type sign language" in which each sign language word is assigned a Japanese word, and (3) "an intermediate type sign language" in which each sign language word is arranged in the same order as a spoken language. The intermediate type sign language is most frequently used. With this type of sign language, sign words are given in the same order as a spoken language. Consider for example a Japanese sentence "冬に北海道へ行こうと思う" equivalent to a phonetic sentence "Watakushi wa fuyu ni hokkaido e ikou to omou" and corresponding to the English sentence "I am thinking of going to Hokkaido in the winter". In this case, only important words (also called independent words) such as a verb "行く"="iku" = "go" and nouns "北海道"= "hokkaido" (Japanese district name), and "冬"="fuyu"="winter", are expressed in the sign language, and other words are generally omitted such as postpositions "てにをは"="te, ni, wo, ha"="various words or word elements similar to English particles but postpositional according to the Japanese Grammar", words dependent on auxiliary verbs "れるられるようたい"="reru, rareru, you, tai" = "various words or word elements used in a corresponding manner in English), and pseudo nouns "ことものの"="koto, mono, no"="various words used in a corresponding manner in English". In addition, the conjugations of conjugative words such as verbs, auxiliary verbs, adjectives, adjective verbs, are generally omitted. Accordingly, the first-mentioned conventional method which simply arranges sign language words in the order recognized, is difficult to express a spoken language.

The sign language mainly used in the U.S.A. is the American Sign Language (ASL). In the U.S.A, the "traditional type sign language" is widely accepted. Also in the case of ASL, articles such as "a, an, the" and prepositions such as "in, at, on, of, by, from" are often omitted.

The second-mentioned conventional method recognizes Japanese finger spellings "あ"= "a", "い"="i", "う"="u" and so on, corresponding to English alphabet characters. Finger spellings are used as an alternative means for the case when sign words cannot be remembered or understood, and so conversation using only finger spellings is rarely had. This conventional method is not satisfactory for conversation, because each word in a sentence is expressed by giving the finger spellings of all characters or letters of the word.

Such problems of sign language recognition are associated not only with Japanese sign languages but also with other sign languages for English and other foreign languages. Such problems are inherent to the sign language which provides communications by changing the positions and directions of hands (inclusive of fingers, backs, palms), elbows, and arms, and by using the whole body including the face, chest, abdomen, and the like.

SUMMARY OF THE INVENTION

It is an object of the present invention to translate recognized sign words into a spoken language.

In order to achieve the above object of the present invention, there is provided a sign language translation system and method which produces a spoken language by recognizing a series of hand motions to translate them into words, analyzing the dependency relation between the recognized words, supplementing omitted words between the recognized words by using omission/supplement rules, and changing the conjugations of conjugative words such as verbs and auxiliary verbs.

Namely, case postposition (Japanese post-positional particle) are supplemented between words having a dependence relationship: a case postposition determined by the dependence relationship is inserted. between the recognized words.

In addition, the omitted conjugation at the ending of each conjugative word having a dependence relationship is determined, while referring to the predefined conjugations of conjugative words including verbs, adjectives, adjective verbs, and auxiliary verbs.

Also supplemented are omitted auxiliary verbs, postpositions, pseudo nouns, and conjunctions, respectively providing the semantic and time sequential relationships between depending and depended words having a dependence relationship.

For example, given a train of words in a sign language "私"="watakushi"="I", "冬"="fuyu"= "winter", "北海道"="Hokkaido", "行く"="iku"="go", and "思う"="omou"="think", the dependence analysis finds that the words "私", "冬" and "北海道" are the subjective case, place case, and time case of the depended verb "行く", respectively. Next, the omission/supplement rule supplements case postpositions "wa", "ni", and "e" after the words "私", "冬", and "北海道", respectively. A case postposition "と"="to"="of" is added before the verb "思う". An auxiliary verb "う"="u" (meaning an intention) is added between the words "行く" and "思う". A conjugation at the ending of the conjugative word "行く" "iku"="go" is changed in order to correctly connect, from the viewpoint of gramar, the words "行く" "う" and "と思う"="to omou"= "thinking of". As a result, a spoken language sentence "私は冬に北海道へ行こうと思う"="I am thinking of going to Hokkaido in the winter" can be generated.

DESCRIPTION OF THE PREFERRED EMBODIMENTS

Embodiments of the present invention will be described with reference to FIGS. 1 to 14.

Figure 1:
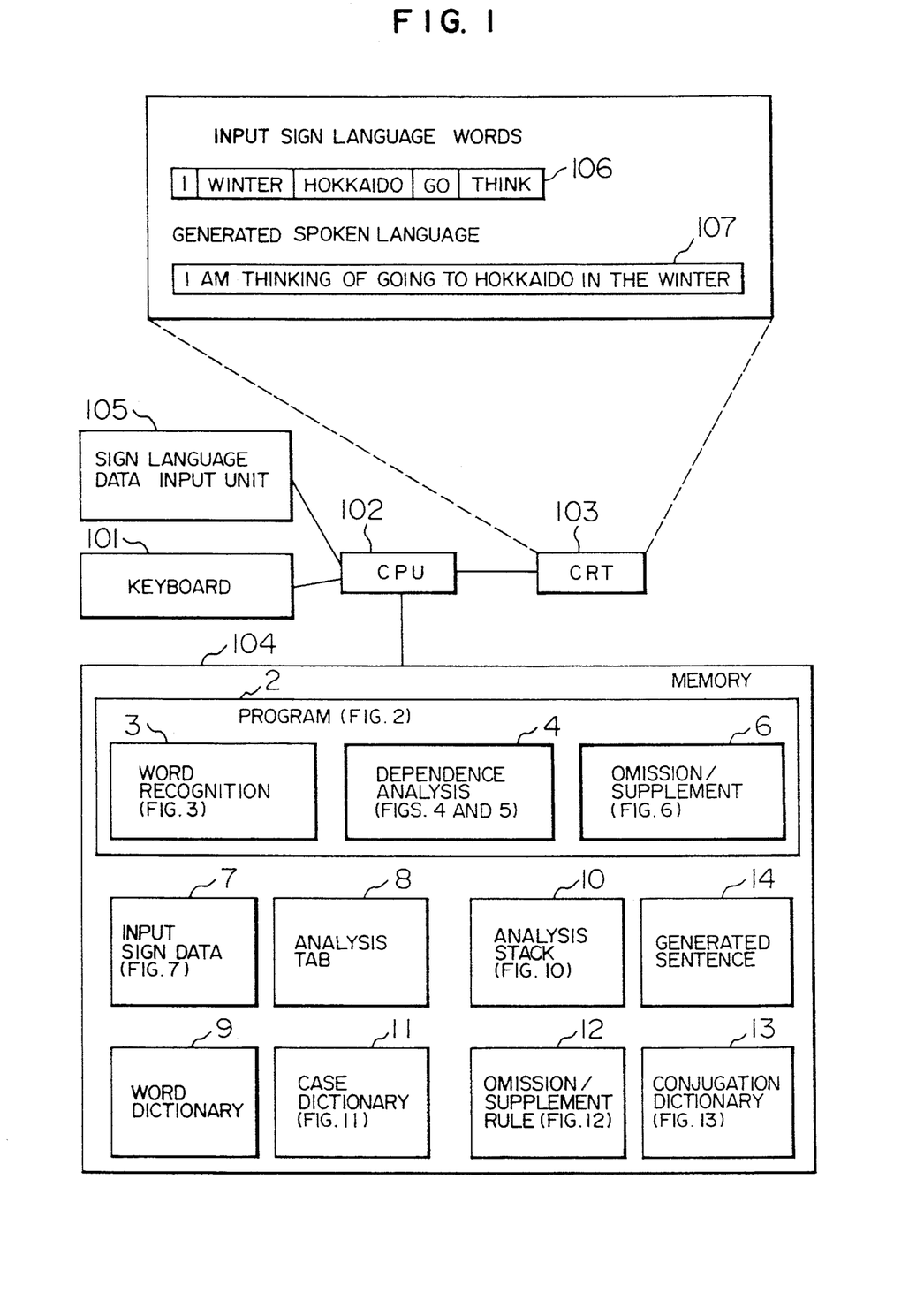
FIG. 1 shows the structure of a sign language translation system according to an embodiment of the present invention.

FIG. 1 shows the structure of a Japanese sign language translation system according to an embodiment of the present invention. This system is realized by a computer having a CPU 102, input devices (keyboard 101 and sign data input device 105), an output device (a CRT 103), and a memory 104. Stored in the memory 104 at a predetermined memory area are programs 2 for generating sentences of a spoken language expression from input sign data 7 supplied from the sign data input device 105. The programs 2 are loaded to the CPU 102 for various procedures to be performed. These programs 2 include a program 3 for recognizing a train of words from the input sign data 7, a program 4 for analyzing dependency relationship between words, and a program 6 for supplementing omitted words in and between words having the dependency relation to generate a sentence 14. Reference numeral 7 represents a memory area in which the input sign data is stored. Reference numeral 8 represents a memory area in which an analysis table to be used by the programs 2 is stored. Reference numeral 10 represents a memory stack area to be used by the dependency analyzing program 4. Reference numeral 9 represents a memory area in which a word dictionary is stored, the word dictionary storing the meaning and part of speech of each word to be used by the sign language. Reference numeral 11 represents a memory area in which a case dictionary is stored, the case dictionary being used for defining the case of a word dependable on a predicate word such as a verb to be used by the sign language. Reference numeral 12 represents a memory area in which omission/ supplement rules are stored, the rules providing a method of supplementing omitted words in and between words having the dependency relation. Reference numeral 13 represents a memory area in which a conjugation table is stored, the table defining the conjugation rule for conjugative words. Reference numeral 14 represents a memory area in which generated sentences are stored.

In the sign language translation system shown in FIG. 1, CPU 102 generates translated sentences in accordance with the programs loaded from the memory 104. In this case, a discrete hardware structure may be used for the execution of part or the whole of the word recognition (corresponding to the program 3 in FIG. 1), dependency relationship analysis (corresponding to the program 4 in FIG. 1), word omission/ supplement (corresponding to the program 6 in FIG. 1), and other functions.

Figure 7:
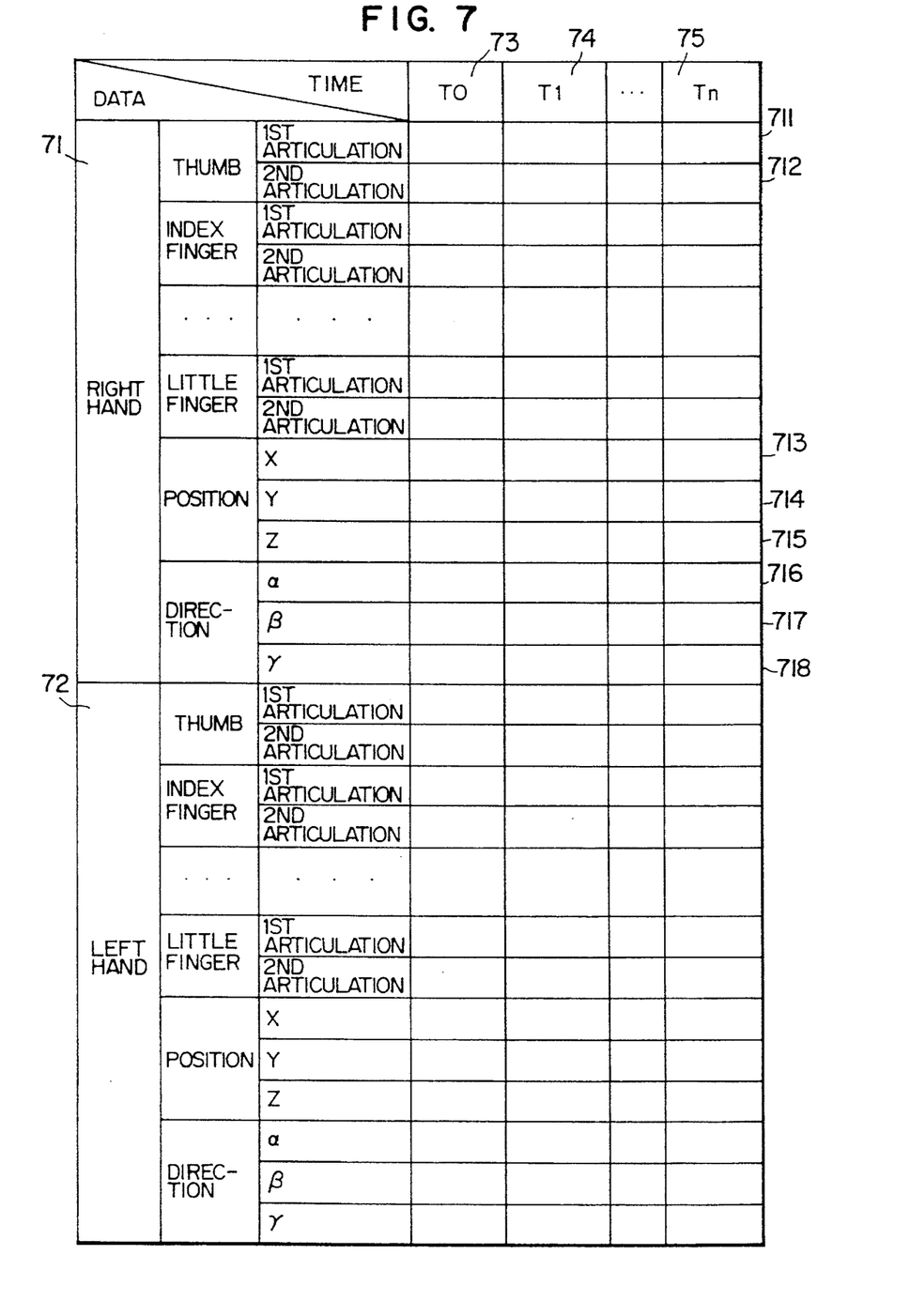
FIG. 7 shows the data structure of recognized sign data.

FIG. 7 shows the detailed structure of input sign data in the form of a table. This table stores the history of right and left hand data 71 and 72, which represent states of the right and left hands, supplied from the input device 105 at a predetermined time interval. It is well known to use gloves for the input device 105, which gloves allow the position and direction of each hand and the flection of each finger to be converted into electrical signals. The motion of hands may be input by using a TV camera for example. The right and left hand data 71 and 72 are stored in the table at the locations 73, 74, . . . , 75 at sampling times T0, T1, . . . , Tn, respectively. Data 711 indicates the first articulation angle of a thumb of the right hand, and data 712 indicates the second articulation angle of a thumb of the right hand. Data 713 indicates the x-coordinate position of the right hand, data 714 indicates the y-coordinate position of the right hand, and data 715 indicates the z-coordinate position of the right hand. Data 716 indicates the angle of the direction of the right hand relative to the x-axis, data 717 indicates the angle of the direction of the right hand relative to the y-axis, and data 718 indicates the angle of the direction of the right hand relative to the z-axis.

Figure 8:
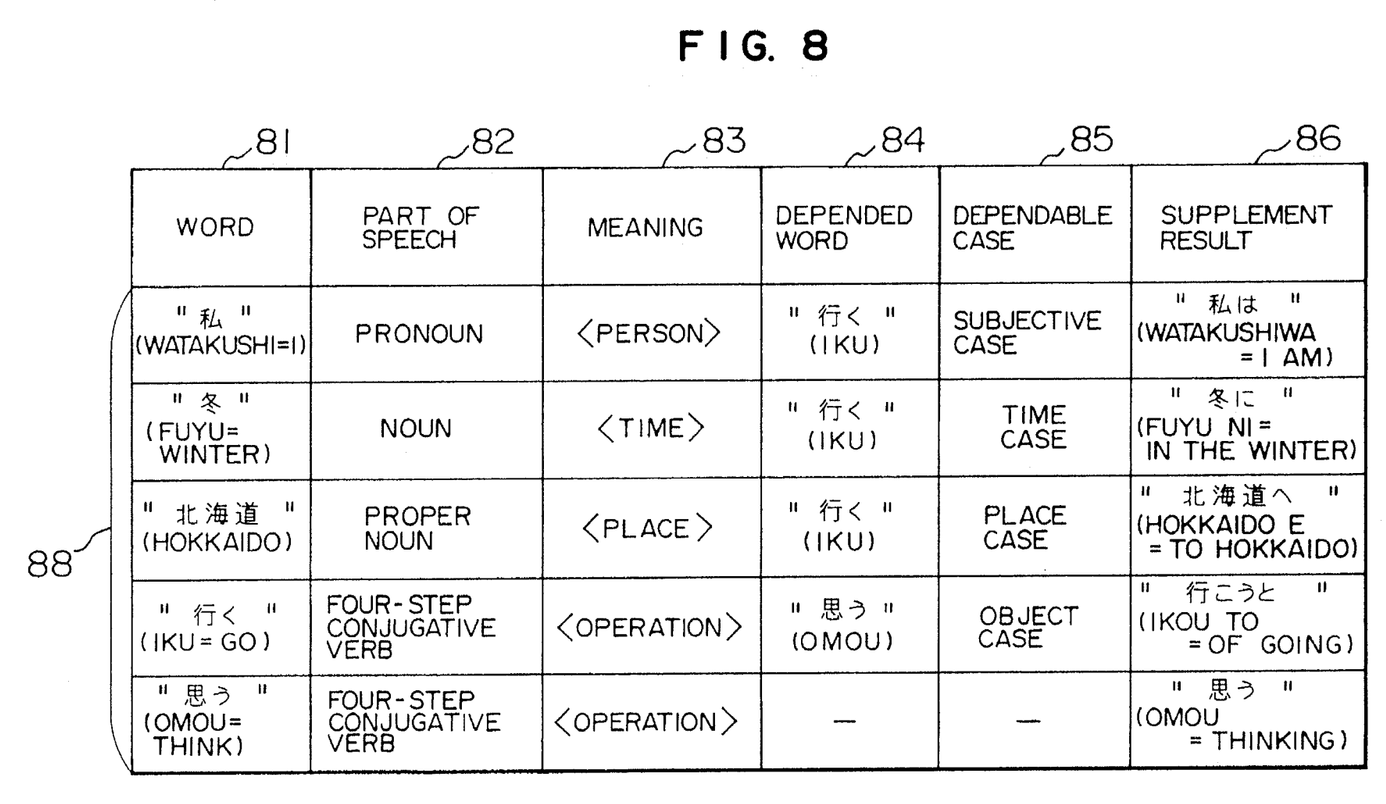
FIG. 8 shows the data structure of an analysis table.

FIG. 8 shows the details of the analysis table 8 which stores data of a train of words 88 obtained through analysis of the data 7 supplied from the input device 105. This table is constructed of a word field 81, part of speech field 82, meaning field 83, depended word field 84, dependency relationship field 85, and supplemented result 86.

Figure 9:
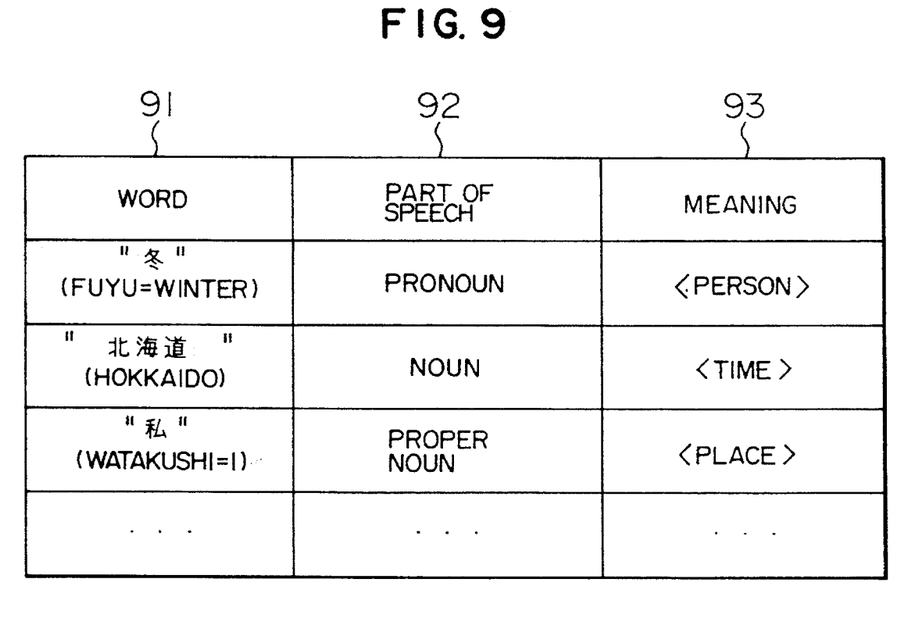
FIG. 9 shows an example of a word dictionary.

FIG. 9 shows an example of the word dictionary 9 which stores a part of speech 92 of each word 91 used by the sign language and the meaning 93 thereof.

Figure 10:
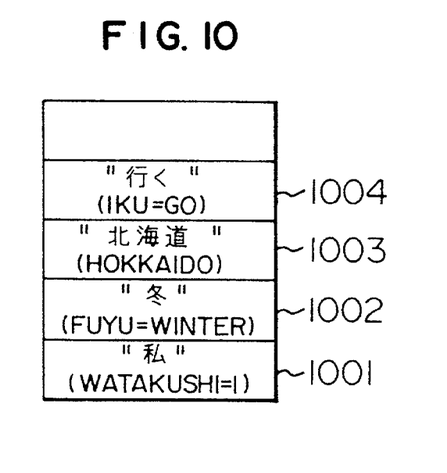
FIG. 10 shows the structure of an analysis stack.

FIG. 10 shows the structure of the analysis stack area 10, indicating that words 1001 to 1004 were stacked in this area during the dependency analysis.

Figure 11:
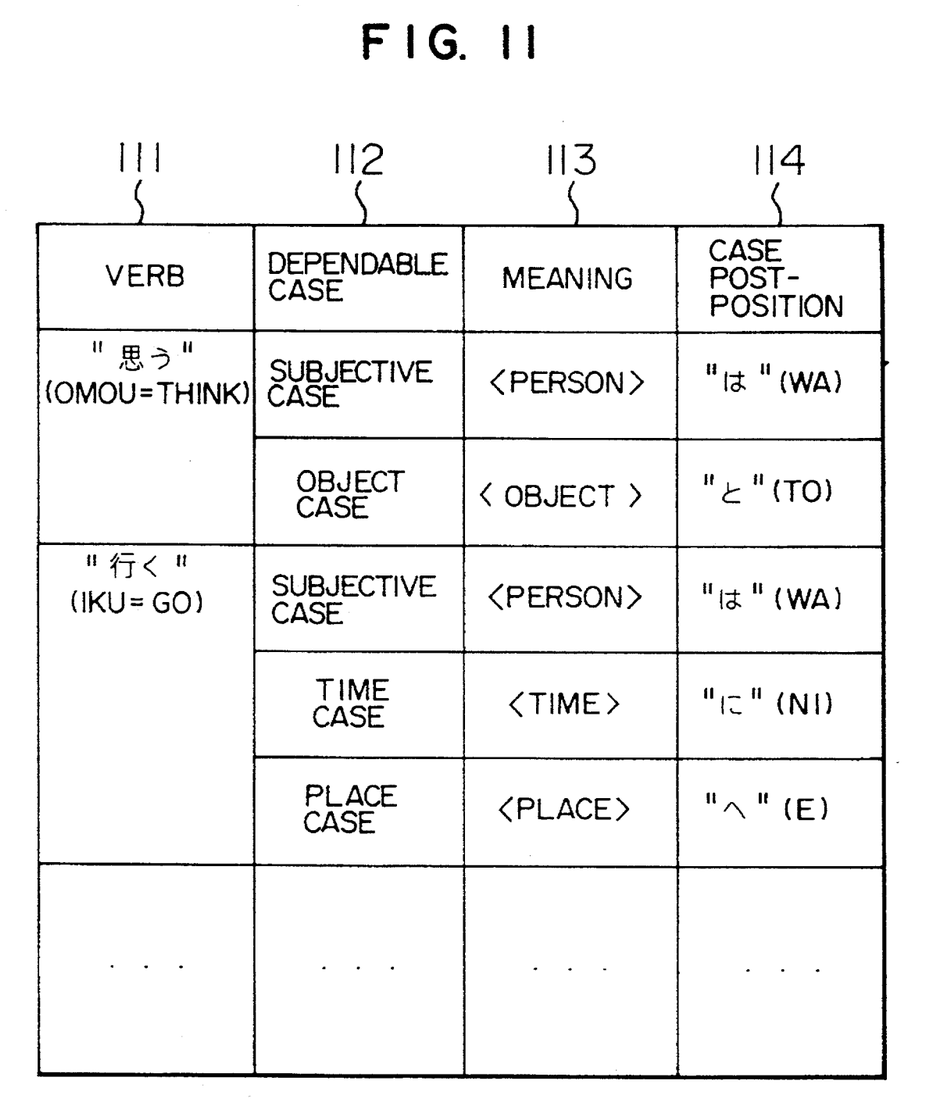
FIG. 11 shows an example of a case dictionary.

FIG. 11 shows an example of the case dictionary 11 which stores a dependable case 112 for a predicate word such as a verb 111, dependable case meaning 113, and case postposition 114 to be added to the word of the dependable case.

Figure 12:
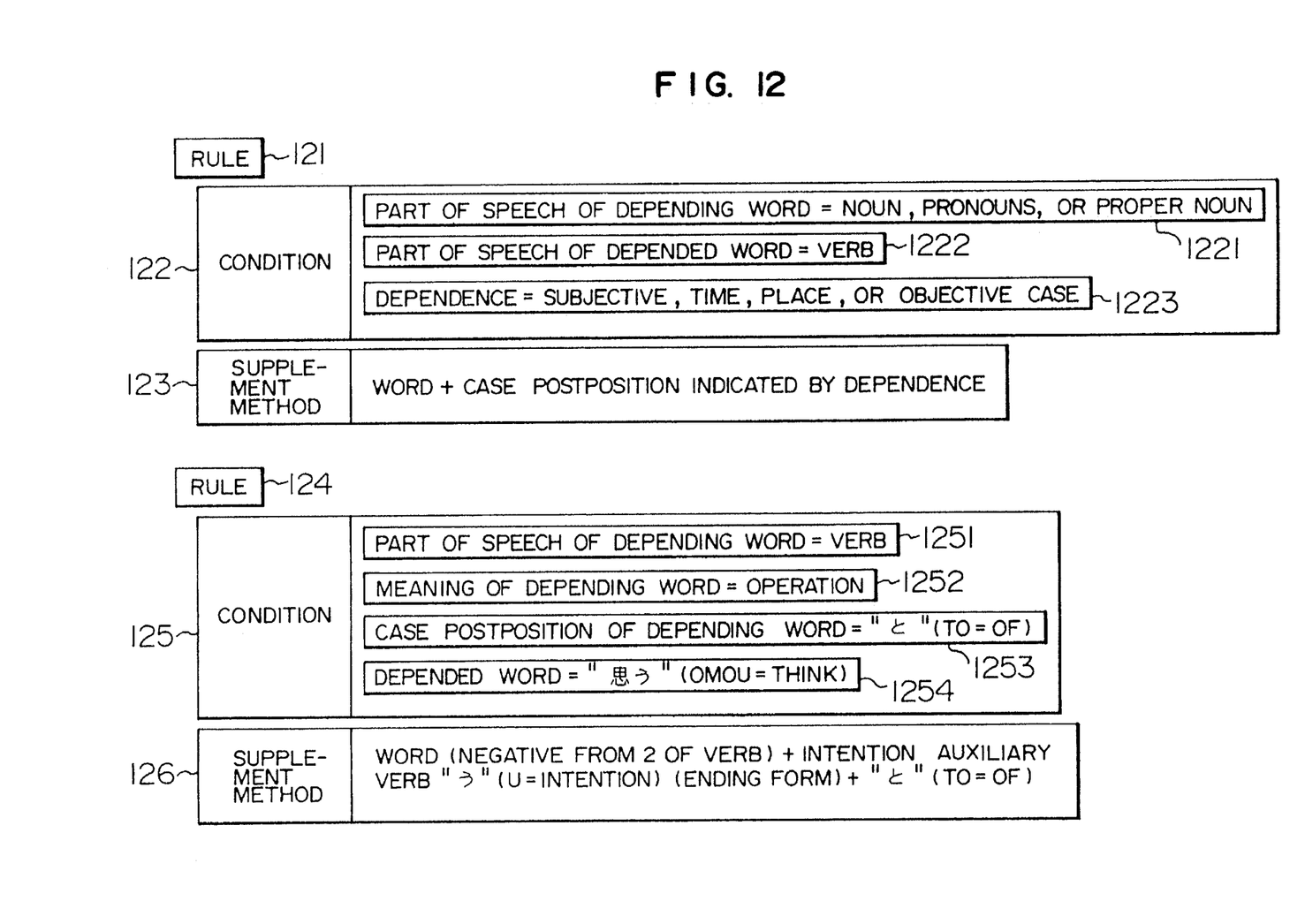
FIG. 12 shows examples of omission/supplement rules.

FIG. 12 shows examples of the omission/ supplement rule 12. The rule 121 illustrates a supplement method 123 of supplementing a depending word, when the condition 122 is met wherein all conditions 1221, 1222, and 1223 are concurrently satisfied. Similarly, the rule 124 illustrates another supplement method 126 of supplementing a depending word, when the condition 125 is met wherein all conditions 1251 to 1254 are satisfied. For example, with the rule 121, on the conditions that the part of speech of a depending word is a noun, pronoun, or proper noun, that the part of speech of the depended word is a verb, and that the dependable case is a subjective case, time case, position case, or objective case, a case postposition for the dependable case is supplemented to the depending word.

Figures 13, 14:
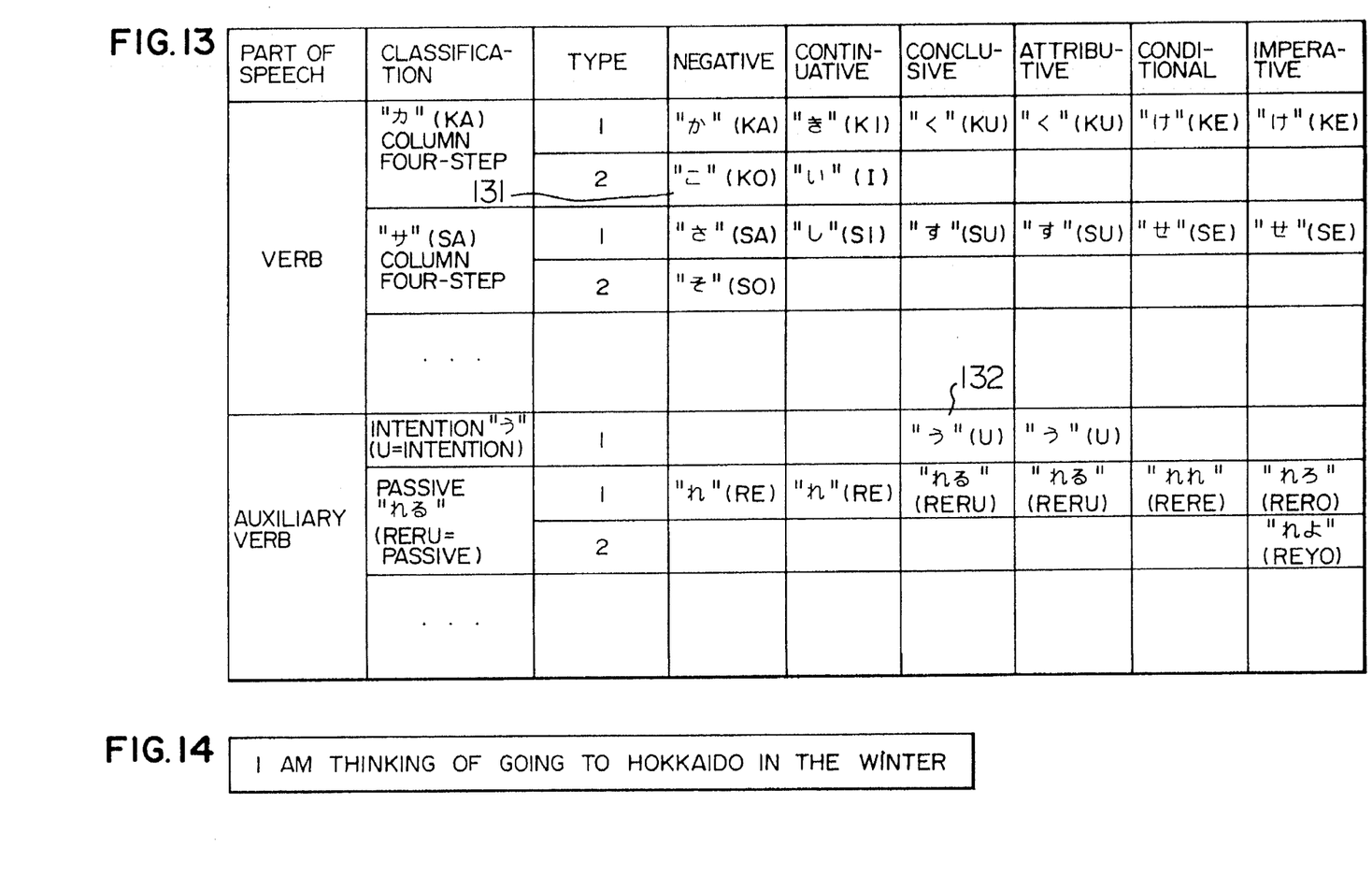
FIG. 13 shows an example of a conjugation table.
FIG. 14 shows an example of a generated sentence.

FIG. 13 shows an example of the conjugation table 13 showing a methodical presentation of the conjugations of conjugative words such as verbs and auxiliary verbs.

FIG. 14 shows an example of a generated sentence 14 subjected to supplement.

The operation of the embodiment will be described with reference to FIGS. 2 to 6.

Figure 2:
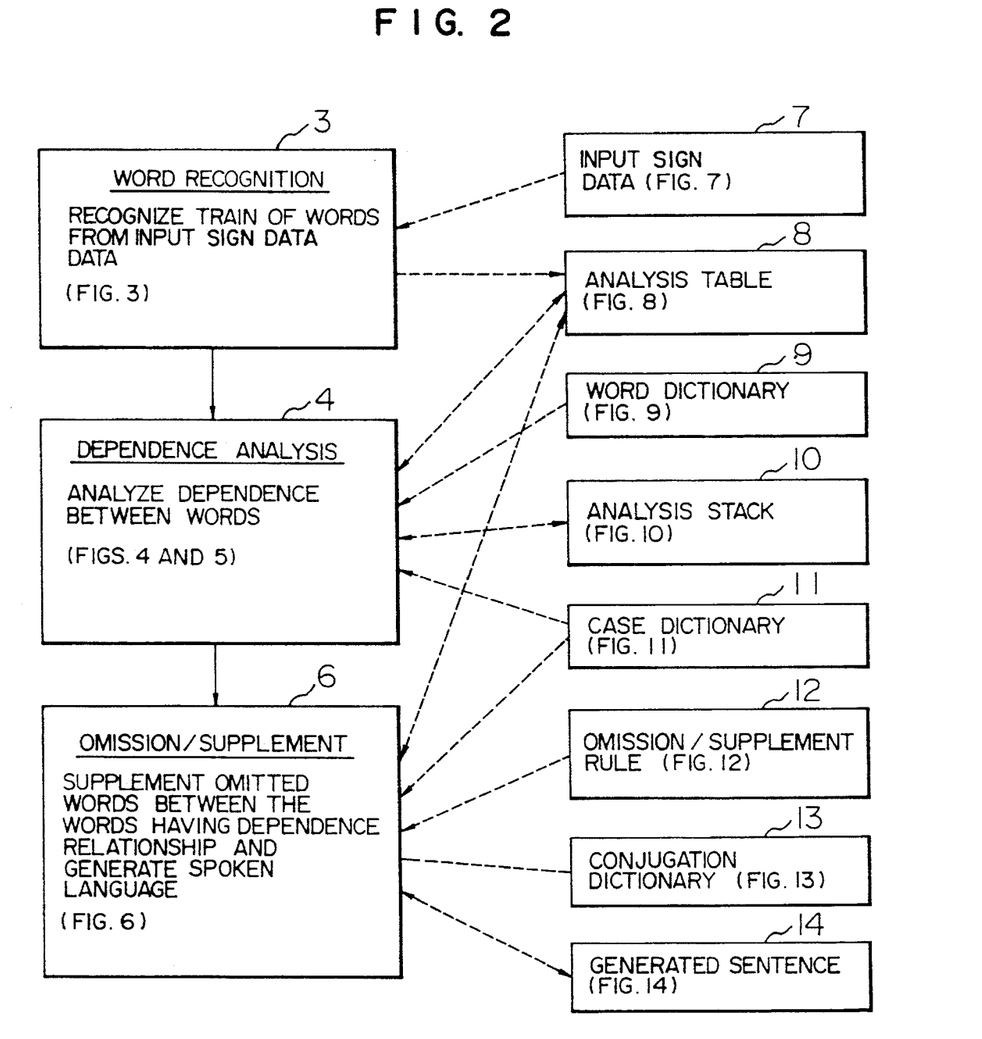
FIG. 2 is a diagram illustrating the outline of the operation to be executed by the embodiment system.

FIG. 2 is a diagram illustrating the overall operation to be executed by the embodiment system. Steps 4 and 6 shown in FIG. 2 concern the subject matter of the present invention.

At Step 3, a train of words are recognized from the input sign data 7, and loaded in the analysis table 8. The details of Step 3 will be given later with reference to FIG. 3.

At Step 4, the dependence relationship between the words of the recognized train is analyzed by using the analysis table 8, word dictionary 9, analysis stack area 10, and case dictionary 11. The analyzed results are stored in the analysis table 8. The details of Step 4 will be given later with reference to FIGS. 4 and 5.

At Step 6, omitted words between the words having the dependency relationship are estimated by using the analysis table 8, case dictionary 11, omission/supplement rules 12, and conjugation table 13, and the estimated words are supplemented to the words having the dependency relationship to generate a spoken language sentence 14 and store it in the memory. The details of Step 6 will be given later with reference to FIG. 6.

Figure 3:
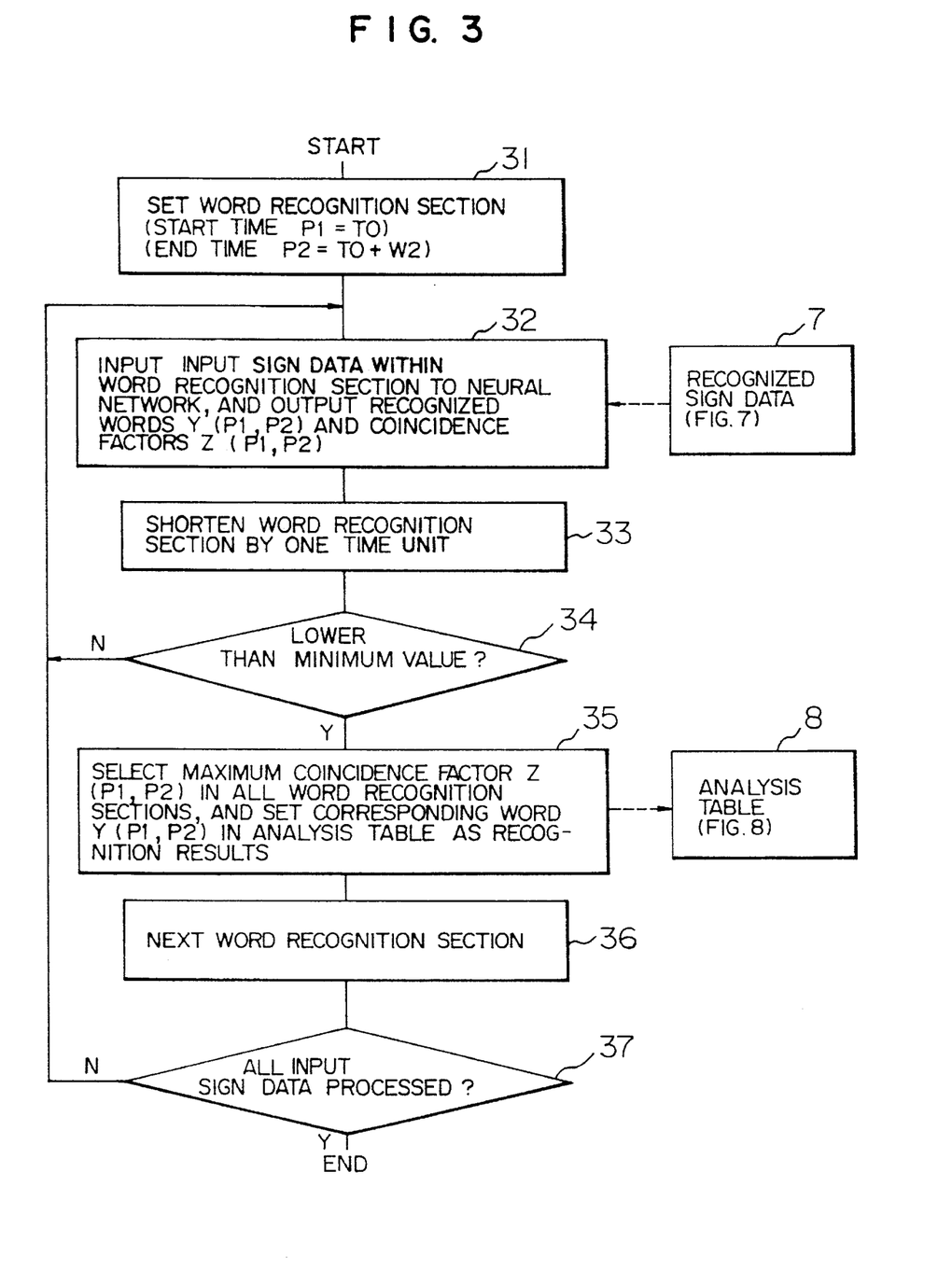
FIG. 3 shows the details of a word recognition procedure.

The details of the word recognition procedure shown in FIG. 3 will be described. First, the principle of the word recognition method used in this embodiment will be described. In a sign language, a word is expressed by a series of hand and/or finger motions, and a sentence is expressed by a train of words. In this embodiment, the history data of a series of motions of hands, corresponding to a train of words, is stored as the input sign data 7. The word recognition program 3 compares, on the basis of maximum coincidence, i.e., a selection method of a train of words having the longest matching portion, the input sign data 7 with history data (not shown) of motions of hands learned in advance through a neural network. The train of words are cut out while being recognized. A typical learning and recognition by a neural network is well known in the art. For example, refer to "Neural Computer—Learning from Brains and Neurons", by Kazuyuki AIHARA, the Publication Department of Tokyo Electric-College, 1988, pp. 93 to 128.

At Step 31, an initial value of a recognition section for the input sign data 7 are set. As the initial value, a start time of the recognition section P1 is set to time T0, and an end time of the recognition section P2 is set to time T0+W2. W2 is a maximum range value of the recognition section.

At Step 32, data in the recognition section is taken out of the input sign data 7, and is inputted to an already learned neural network. The neural network outputs recognized words Y (P1, P2) and coincidence values Z (P1, P2). The more a pattern of inputted data matches an already learned data pattern, the larger the coincidence value Z is. If there are a plurality of words having the same coincidence value Z, these words may be output as a plurality of candidate words. Alternatively, a different evaluation method may be used, or one of a plurality of candidates may be preferentially selected in accordance with a predetermined order, e.g., the first processed word.

At Step 33, the end time of the recognition section is shortened by one unit.

At Step 34, it is checked if the recognition section becomes smaller than the minimum value W1. If not, the procedure returns to Step 32 to again recognize data in the one-time shortened recognition section.

At Step 35, a word having the most accurate recognizing result is selected from among recognized words Y (P1, P2) having the maximum coincidence values Z (P1, P2) in a case of the end time in range of W1 to W2, and is stored in the analysis table 8 at the word field 81.

At Step 36, the recognition section is changed to the next recognition section, and W2 is set as an initial value of the start point for the next recognition section.

At Step 37, it is checked or not the whole input sign data 7 has been processed. If not, the procedure returns to Step 32 to continue the word recognition. If so, the word recognition is terminated. In this manner, a train of words are recognized from the input sign data 7 and stored in the analysis table 8.

As another method or the word recognition procedure, a dynamic programming (DP) matching scheme well known in the field of speech recognition, or other methods, may also be used. For example, a continuous DP matching scheme has been proposed by OKA in "Continuous Word Recognition using Continuous DP", the Speech Study Group of Acoustical Society of Japan, S78-20, pp. 145 to 152, 1978. By using this or other techniques, it is possible to dynamically check the matching between a time sequential and continuous pattern and reference patterns. According to the above-cited document, it is recognized whether a reference pattern is included in a continuous pattern, through the continuous matching while the reference pattern is moved in a direction of the continuous pattern. During this matching, the time sequence of similarity factors of the continuous patterns relative to the reference patterns are obtained. A portion of the continuous pattern having a minimum of the similarity factors which is equal to or lower than a threshold value is selected as a candidate for the reference pattern.

However, if data sampled at a predetermined time interval is used as it is for the continuous pattern and the reference patterns, the time required for pattern matching becomes long in proportion to the length of continuous pattern and the number of reference patterns.

Effective word recognition of the sign language can be performed in the following manner. Specifically, in order to normalize a sign language pattern considering non-linear expansion/compression, a corresponding relation is taken between samples of the reference pattern through DP matching, an average of which samples is determined to produce a sign language reference pattern. In the continuous sign language pattern recognition using the continuous DP matching, the continuous sign language pattern and a reference pattern are compressed and checked whether both coincide with each other, i.e., the matching is obtained while allowing the non-linear expansion/compression in the time domain.

In sign language speech, often persons or articles are expressed by assigning them particular positions, and each position is used thereafter as the pronoun of each person or article. For example, assuming that a person A positions at the front right position and a person B positions at a front left position, a motion of "話す"="hanasu" ="speaking" from person A to person B, means "person A speaks to person B". Since the word recognition at Step 3 supplies the position information, it is possible to correctly recognize a person or article indicated by the pronoun represented by the position information used in the preceding speech.

Figure 4:
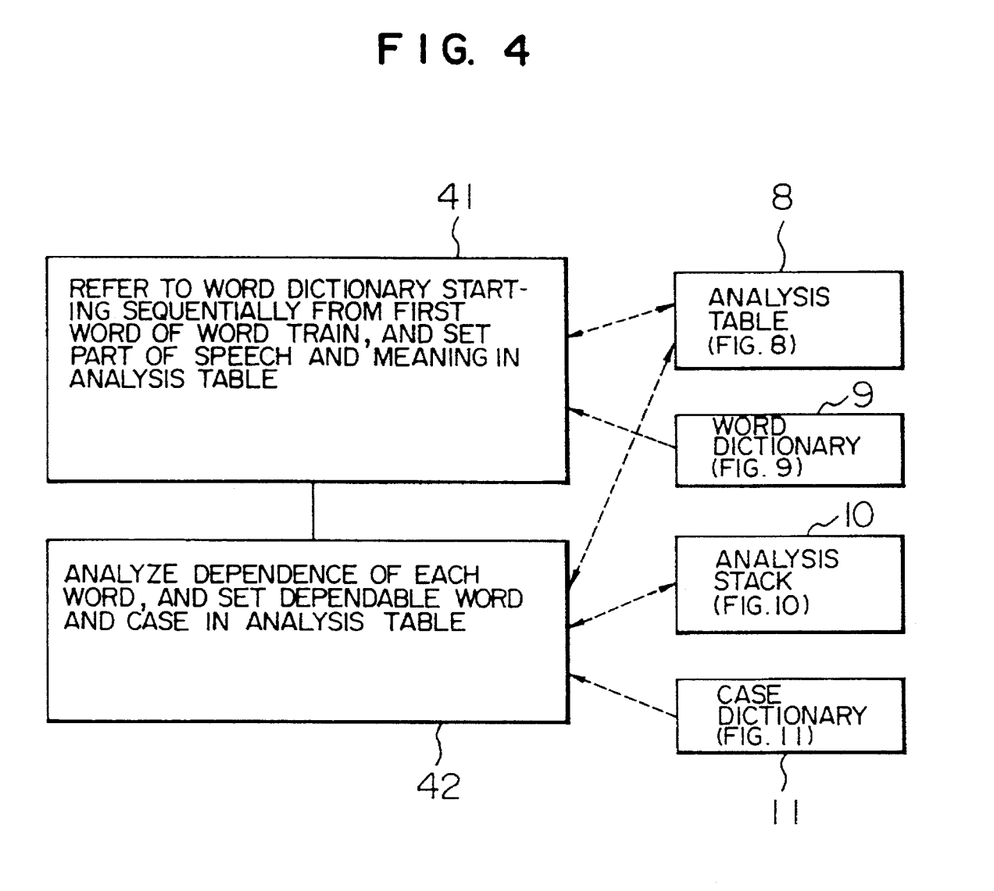
FIG. 4 is a diagram illustrating a dependence analysis procedure.

FIG. 4 shows the contents of the operation to be executed by the dependence analysis program 4. In the following description, a train of words 88 shown in FIG. 8 are illustratively used. This word train has five words "私"

"watakushi"="I", "冬"="fuyu"="winter", "北海道"="Hokkaido", "行く"="iku"="go", and "思う"="omou"="think".

At Step 41, the words in the word field 81 of the analysis table 8 are checked sequentially starting from the start word, whether each word matches to a word of the word dictionary 9. The part of speech 92 and meaning 93 in the word dictionary for the matched word are entered in the part of speech field 82 and meaning field 83 of the analysis table 8.

At Step 42, the depended word and dependence relationship of each matched word are analyzed and entered in the depended word field 84 and dependence relationship field 85 of the analysis table 8.

Figure 5:
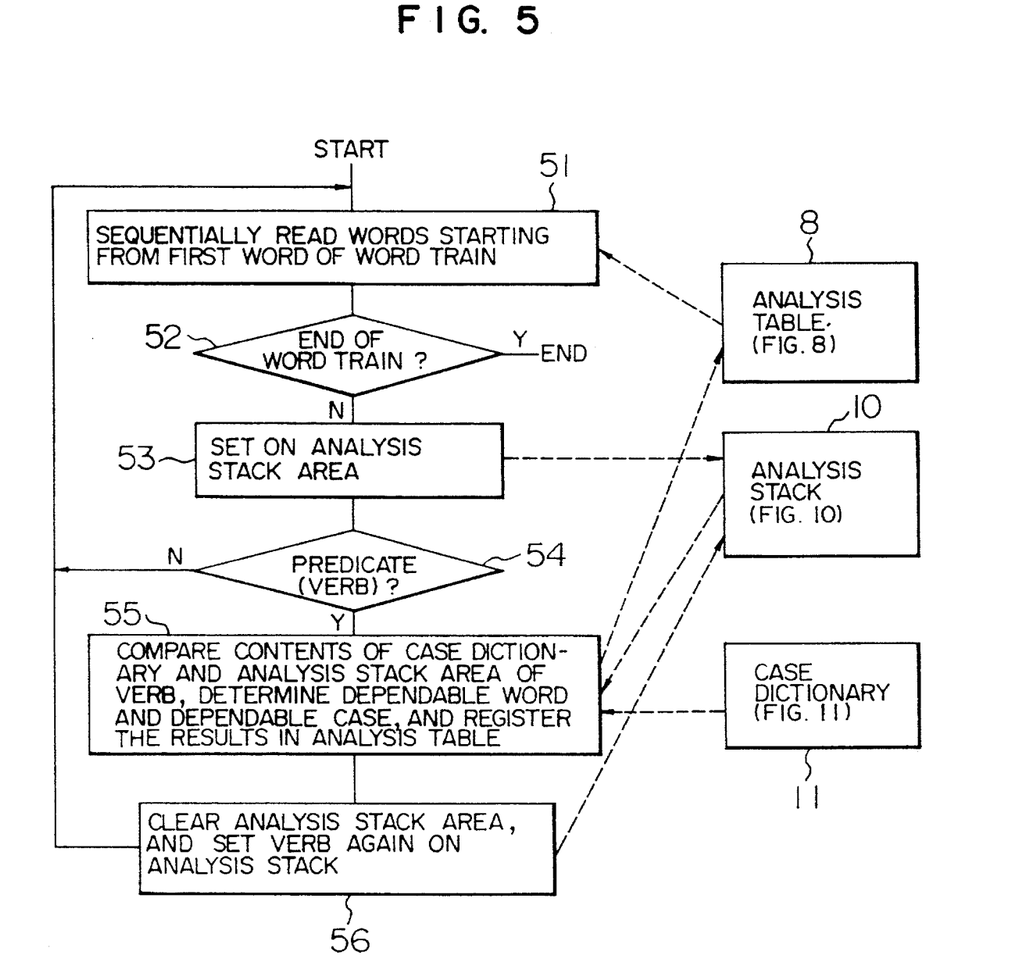
FIG. 5 shows the details of the dependence analysis procedure.

The details of Step 42 will be given with reference to FIG. 5. First, the principle of the dependence relationship analysis will be described.

It is known that a dependence relationship is present between phrases constituting a sentence, and a one-sentence/one-case principle and a no-cross principle are applied.

The one-sentence/one-case principle teaches that a different case is provided to each predicate in one sentence, without occurrence of the same two cases. The no-cross principle teaches that a line indicating the dependence relationship will not cross another line. The dependence analysis for a train of words is performed using these principles.

At Step 51, the words 81 in the analysis table are sequentially read from the analysis table 8, starting from the first word.

At Step 52, it is checked if there is no word to be processed. If there is no word, the procedure is terminated.

At Step 53, the read-out words are stacked on the analysis stack area 10. FIG. 10 shows the four words stacked, starting from the first word.

At Step 54, the part of speech of each word is checked. If the part of speech is a predicate such as a verb, the procedure advances to Step 55, and if not, returns to Step 51.

At Step 55, the case dictionary 11 is referred to with respect to the verb on the analysis stack area 10 to determine the cases of depending words, through comparison between the contents of the case dictionary 11 and analysis stack area 10. In the example shown in FIG. 10, the verb "行く"="iku"="go" is referred to the case dictionary 11 to check the contents shown in FIG. 11. Upon the comparison with the contents on the analysis stack area 10 shown in FIG. 10, a correspondence can be obtained, which shows that "私"="watakushi"="I" 1001 is the subjective case for the verb "行く"="iku"="go", "冬"="fuyu"="winter" is the time case, and "北海道"="Hokkaido" is the place case. This data is set in the analysis table 10 at the depended word field 84 and dependence relationship field 85.

In the above example, the case frame of predicates has been described for the dependence relationship analysis. The dependence relationship between substantives such as nouns may also be performed using the case frame of substantives. For example, the noun frame "どこから"="dokokara"="from where" and "どこまで"="dokomade"="to where" for defining a "距離" "kyori"="distance" determine a certain dependence relationship between nouns.

If the dependence relationship is ambiguous and cannot be analyzed definitely, the most probable one may be selected or a plurality of candidates may be used at the later processes.

At Step 56, the entries on the analysis stack area 10 whose dependence relationships have been determined, are cleared with only the verb being left uncleared, the remaining words of the train are set on the analysis stack 10 to further continue the dependence analysis.

As understood from the above description, when the next word "思う"="omou"="think" is set on the analysis stack area 10, the contents of "思う"="omou"="think" in the case dictionary 11 are referred to and compared with the contents in the analysis stack area 10. As a result, the word "行く"="iku"="go" is determined as the objective case of the word "思う"="omou"="think". The results of the dependence analysis are stored in the analysis table 8. It is noted that there is no-cross between dependence relationships in the above analysis.

Figure 6:
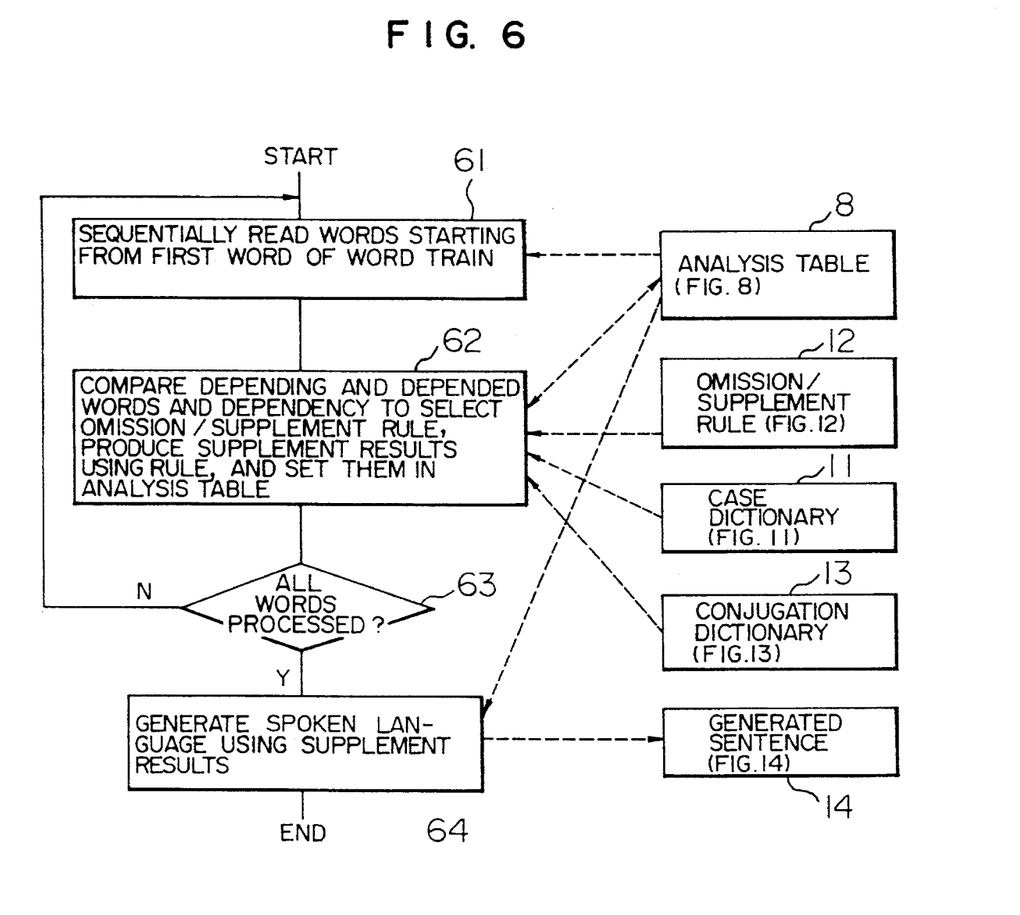
FIG. 6 shows the details of an omission/ supplement procedure.

FIG. 6 shows the details of the operation to be executed by the omission/supplement program 6. This program supplements omitted words by using the omission/supplement rules 12 or the like, while considering the word pairs having a dependence relationship determined by the dependence analysis program 4.

At Step 61, the words 81 in the analysis table 8 are sequentially read starting from the first word.

At Step 62, it is checked whether a pair of depending and depended words, and the dependence relationship 85 between the words, match conditions of a proper omission/supplement rule 12 to search for the rule satisfying the conditions. Next, the supplement method designated by the searched rule is executed and the results are stored in the analysis table 8 at the supplement result field 86.

At Step 63, it is checked if all the words in the analysis table 8 have been processed. If not, the procedure returns to Step 61 to repeat the above operation.

The above procedure will be explained by using a particular example. As the first word "私"="watakushi"="I" is read from the analysis table 8, the depended word "行く"="iku"="go" and dependence relationship "主格" "shukaku"="subjective case" are also read, and these are compared with each of the omission/supplement rules 12 to identify the rule 121. The supplement method 123 is therefore executed so that the case postposition "は"="wa" (Japanese postpositional particle representing the subjective case) is read from the case dictionary 11 and supplemented to the word "私"="watakushi"="I" after it. The results "私は"="I am" are stored in the analysis table 8 at the supplement result field 86. Similarly, the case postpositions "に"="ni"="in" and "へ"="e"="to" are supplemented to the words "冬"="fuyu"="winter" and "北海道"="Hokkaido"="hokkaido", respectively, to obtain the results "冬に"="fuyu ni"="in the winter" and "北海道へ"="Hokkaido e"="to Hokkaido". To the word pair of "行く"="iku"="go" and "思う"="omou"="think", the rule 121 is first applied, and the case postposition "と"="to"="of" is supplemented after the word "行く"="iku"="go". Next the rule 124 is applied, and the supplement method 126 is executed so that "う"="u" (Japanese postpositional particle indicating intention) is supplemented between "行く"="iku"="go" and "と"="to"= "of". The conjugations of this word "行く"="iku"="go" are further determined so as to satisfy the conjugative conditions defined by the supplement method 126. Accordingly, the "未然形"="mizenkei"="negative form (this is an arbitrary term since "mizenkei" has various functions according to the Japanese grammar)" 2 of the word "行く"="iku"="go" is determined as "こ"="ko" 131 from the conjugation table 13. Similarly, the conclusive form of "う"="u" is determined as "う"="u" 132 from the conjugation table 13. In this manner, the result obtained by the supplement method 126 becomes "行こうと"="ikou to"="of going" which is stored in the analysis table 8 at the supplement result field 86.

If any omission/supplement rule cannot be found, the word 81 per se is stored in the supplement result field 86. In this case, even if the analysis fails in the midst of procedures, the train of words analyzed until then are output, to help the user obtain some information. A symbol representing a failure of supplement may be stored in the supplement result field 86.

At Step 64, the supplement results stored in the analysis table at the result field 86 are connected together to generate and store a translated spoken-language sentence 14 which is displayed on CRT 103 as a translated spoken-language sentence 107. The train of words 81 entered as the sign words 106 are also displayed on CRT 103. The translated spoken-language sentence may be output as sounds-by using a voice synthesizer.

The motions of hands or the like may be displayed on CRT 103 in response to the translated spoken-language sentence by using computer graphics techniques. In such a case, the procedures of this embodiment are reversed by time sequentially synthesizing images while referring to a dictionary of sign elements each representing a minimum unit of a sign language word, and to a dictionary of words each constituted by a combination of sign elements. With synthesized images of a sign language, an auditory-impaired person can visually confirm his or her sign language. The output may be any combination of a sentence text, voice representations, and synthesized images.

According to the present invention, omitted words between the sign language words can be estimated and supplemented, allowing to translate a sign language into a spoken language.

The present invention is not limited only to a Japanese sign language, but is applicable to various other sign languages. In the case of Japanese language, omitted words can be supplemented using case frame grammar models as in the above-described embodiment. For the European and American languages such as English, the order of words has a significant meaning. In such a case, omitted words may be supplemented by using syntactic grammar models.

What is claimed is:

1. A sign language translation system, comprising:

input means for inputting motion of hands as electric signals;

sign language word generating means for recognizing words in accordance with said input electric signals and generating sign language words;

storage means for storing conjugations or translations of said generated sign language words and postpositions or auxiliary verbs to be supplemented between said generated sign language words;

dependence analyzing means for analyzing a dependence relationship between successive ones of said recognized words in accordance with said stored translations of said recognized words and outputting analyzed results;

spoken language generating means for generating, in accordance with said analyzed results, an audibly communicated sentence by supplementing said stored postpositions or auxiliary verbs and providing said stored conjugations of conjugative words; and output means for outputting said generated spoken language.

2. A sign language translation system according to claim 1, wherein said input means comprises an input device for inputting the motion of hands at a predetermined time interval.

3. A sign language translation system according to claim 1, wherein said sign language word generating means recognizes sign language words, using a neural network which learns hand motions corresponding to said sign language words, by sequentially performing critical matching comparison between said learned hand motions and said input motion of hands.

4. A sign language translation system according to claim 1, wherein said sign language word generating means recognizes sign language words by comparing input motion of hands with stored hand motions based on a DP matching scheme.

5. A sign language translation system according to claim 1, wherein when the recognition result of said word recognizing means is unable to identify a final single word, a plurality of word candidates are sent to said dependence analyzing means.

6. A sign language translation system according to claim 1, wherein said dependence analyzing means analyzes the dependence relationship by performing the steps of:

storing said recognized words into a stack memory in the sequence of word recognition;

producing an analyzing table containing cases, parts of speech and translations of said stacked word;

determining a word to be analyzed in the stack;

searching words, from the stack, which are capable of depending on said determined word in accordance with said analyzing table; and storing said searched words into a memory.

7. A sign language translation system according to claim 6, wherein said dependence analyzing means determines a word to be analyzed in the stack when the word is a declinable word, wherein a declinable word indicates a word describing an action, function, existence, property or condition thereof.

8. A sign language translation system according to claim 7, wherein said dependence analyzing means moves said searched words corresponding to said determined word from the stack to said analyzing table together with information concerning the dependence relationship between the determined word and the searched words, wherein said determined word remains in the stack.

9. A sign language translation system according to claim 8, wherein said spoken language generating means supplements said stored postpositions or auxiliary verbs in accordance with said moved words in said analyzing table and corresponding information concerning a dependence relationship between the determined word and the moved words.

10. A sign language translation system according to claim 7, wherein said dependence analyzing means further performs dependence analysis with respect to substantives.

11. A sign language translation system according to claim 1, wherein said omission/supplement means supplements omitted words and provides conjugations of conjugative words, in accordance with the words recognized by said word recognizing means and an omission/supplement rule determined by said dependence analyzing means.

12. A sign language translation system according to claim 1, wherein each said omitted word to be supplemented is at least one of an auxiliary verb, postposition, pseudo pronoun, and conjunction, respectively representing a semantic and time sequential relationships between words.

13. A sign language translation system according to claim 1, wherein said output means outputs said generated spoken language in at least one of a text representation and voice expression wherein the dependence between said recognized words is analyzed using said recognized results, and a predetermined process is executed using said analyzed results to generate said spoken language by supplementing omitted words and providing the conjugations of a conjugative word.

14. A sign language translation system according to claim 1, wherein said output means outputs synthesized images of the hand motion corresponding to a sign language wherein the dependence between said recognized words is analyzed using said recognized results, and a predetermined process is executed using said analyzed results to generate said spoken language by supplementing omitted words and providing the conjugations of a conjugative word.

15. A sign language translation system according to claim 1, wherein said output means outputs a train of words recognized when a spoken language cannot be generated.

16. A sign language translation system according to claim 1, wherein said language generating means further comprises:

word reading means for reading the words recognized by said word recognizing means;

analysis stacking means for individually stacking the read words comprising a sentence;

speech determining means for determining the part of speech of each word stacked in said analysis stacking means;

a case dictionary for determining the conjugation of each word in the analysis stacking means relative to the verb determined by said determining means; and an analysis table for receiving the properly conjugated words from said analysis stacking means relative to the verb.

17. A sign language translation system according to claim 1, wherein, when said dependence analyzing means fails to analyze a dependence relationship between said determined word and said searched words, said spoken language generating means outputs recognized words without supplementing said stored postpositions or auxiliary verbs and without providing said stored conjugations of conjugative words.

18. A sign language translation method comprising the steps of:

inputting motion of hands;

recognizing words corresponding to said input motion of hands;

generating a spoken language using a dependence relationship between said recognized words;

wherein the dependence between said recognized words is analyzed using said recognized results, and a predetermined process is executed using said analyzed results to generate said spoken language by supplementing omitted words and providing the conjugations of a conjugative word; and outputting said generated spoken language.

19. A sign language translation method according to claim 18, wherein spatial information representing a pronoun and time lapse entered in a sign language is recognized to translate said spatial information into a corresponding word.

* * * * *